United States Patent
Allin et al.

(10) Patent No.: US 8,306,883 B2
(45) Date of Patent: Nov. 6, 2012

(54) CONSTRUCTION PAYMENT MANAGEMENT SYSTEMS AND METHODS WITH SPECIFIED BILLING FEATURES

(75) Inventors: Patrick J. Allin, Lake Bluff, IL (US); Charles C Cherry, Glenview, IL (US); William H. Eichhorn, Hinsdale, IL (US); John W. Smith, Grayslake, IL (US)

(73) Assignee: Textura Corporation, Deerfield, IL (US)

( * ) Notice: Subject to any disclaimer, the term of this patent is extended or adjusted under 35 U.S.C. 154(b) by 1225 days.

(21) Appl. No.: 12/112,754

(22) Filed: Apr. 30, 2008

(65) Prior Publication Data

US 2009/0012886 A1 Jan. 8, 2009

Related U.S. Application Data

(63) Continuation-in-part of application No. 12/061,805, filed on Apr. 3, 2008.

(60) Provisional application No. 60/926,867, filed on Apr. 30, 2007.

(51) Int. Cl.
*G06Q 10/00* (2012.01)
(52) U.S. Cl. .................................................. 705/34
(58) Field of Classification Search ............. 705/34
See application file for complete search history.

(56) References Cited

U.S. PATENT DOCUMENTS

| | | | |
|---|---|---|---|
| 4,700,318 A | 10/1987 | Ockman | |
| 4,774,664 A | 9/1988 | Campbell et al. | |
| 4,876,648 A | 10/1989 | Lloyd | |
| 4,937,743 A | 6/1990 | Rassman et al. | |
| 4,989,141 A | 1/1991 | Lyons et al. | |
| 5,189,606 A | 2/1993 | Burns et al. | |
| 5,239,462 A | 8/1993 | Jones et al. | |
| 5,323,315 A | 6/1994 | Highbloom | |
| 5,521,815 A | 5/1996 | Rose, Jr. | |
| 5,644,727 A | 7/1997 | Atkins | |
| 5,699,527 A | 12/1997 | Davidson | |
| 5,704,045 A | 12/1997 | King et al. | |
| 5,709,410 A | 1/1998 | Reeves, Jr. | |
| 5,761,674 A | 6/1998 | Ito | |
| 5,819,230 A | 10/1998 | Christie et al. | |
| 5,870,720 A | 2/1999 | Chusid et al. | |
| 5,870,721 A | 2/1999 | Norris | |
| 5,875,437 A | 2/1999 | Atkins | |

(Continued)

OTHER PUBLICATIONS

Computerease Inc., "Paragon, Software for Contractors", p. 1.
Construction Monitoring Systems LLC, "About AD Logo", Welcom to AccuDraw, Available Online at: <http://accudraw.com/aboutAccuDraw.asp?UPK=&IoD=&LoT=&EID=&SID=>, p. 1, Retrieved Jun. 9, 2004.

(Continued)

*Primary Examiner* — Russell S Glass
(74) *Attorney, Agent, or Firm* — Michael Best & Friedrich LLP (57) ABSTRACT

Systems and methods for managing payments. One construction of the system includes a software enabled user interface accessible by a first party and a second party, at least one computer readable memory, and a processor. The processor is configured to selectively operate in a specified billing mode in response to an input received from the first party. The processor is configured to receiving invoice details from the first party when operating in the specified billing mode and from the second party when not operating in the specified billing mode. The processor is further configured to generate an invoice based on the invoice details, display the invoice to the first party and the second party, and request an approval or a rejection of the invoice from the first party or the second party.

24 Claims, 9 Drawing Sheets

U.S. PATENT DOCUMENTS

| | | | |
|---|---|---|---|
| 5,940,812 | A | 8/1999 | Tengel et al. |
| 5,950,206 | A | 9/1999 | Krause |
| 5,995,947 | A | 11/1999 | Fraser et al. |
| 6,021,397 | A | 2/2000 | Jones et al. |
| 6,025,774 | A | 2/2000 | Forbes |
| 6,029,149 | A | 2/2000 | Dykstra et al. |
| 6,038,547 | A | 3/2000 | Casto |
| 6,067,533 | A | 5/2000 | McCauley et al. |
| 6,076,064 | A | 6/2000 | Rose, Jr. |
| 6,112,190 | A | 8/2000 | Fletcher et al. |
| 6,185,543 | B1 | 2/2001 | Galperin et al. |
| 6,366,892 | B1 | 4/2002 | Altman et al. |
| 6,385,594 | B1 | 5/2002 | Lebda et al. |
| 6,393,410 | B1 | 5/2002 | Thompson |
| 6,438,526 | B1 | 8/2002 | Dykes et al. |
| 6,460,021 | B1 | 10/2002 | Kirksey |
| 6,579,764 | B2 | 6/2003 | Kuwazawa |
| 6,581,040 | B1 | 6/2003 | Wright et al. |
| 6,633,875 | B2 | 10/2003 | Brady |
| 6,643,625 | B1 | 11/2003 | Acosta et al. |
| 6,842,760 | B1 | 1/2005 | Dorgan et al. |
| 6,859,768 | B1 | 2/2005 | Wakelam et al. |
| 6,904,412 | B1 | 6/2005 | Broadbent et al. |
| 6,952,717 | B1 | 10/2005 | Monchilovich et al. |
| 6,985,886 | B1 | 1/2006 | Broadbent et al. |
| 7,031,930 | B2 | 4/2006 | Freeman et al. |
| 7,076,455 | B1 | 7/2006 | Fogelson |
| 2001/0027407 | A1 | 10/2001 | Mori |
| 2001/0042785 | A1 | 11/2001 | Walker et al. |
| 2001/0044768 | A1 | 11/2001 | Wares |
| 2001/0047326 | A1 | 11/2001 | Broadbent et al. |
| 2002/0040339 | A1 | 4/2002 | Dhar et al. |
| 2002/0046147 | A1 | 4/2002 | Livesay et al. |
| 2002/0052835 | A1 | 5/2002 | Toscano |
| 2002/0055904 | A1 | 5/2002 | Mon |
| 2002/0069167 | A1 | 6/2002 | Conlow |
| 2002/0073114 | A1 | 6/2002 | Nicastro et al. |
| 2002/0077967 | A1 | 6/2002 | Ingram et al. |
| 2002/0087378 | A1 | 7/2002 | Como |
| 2002/0099617 | A1 | 7/2002 | Fogelson |
| 2002/0107788 | A1 | 8/2002 | Cunningham |
| 2002/0107790 | A1 | 8/2002 | Nielson |
| 2002/0107803 | A1 | 8/2002 | Lisanke |
| 2002/0120480 | A1 | 8/2002 | Kroeger |
| 2002/0124028 | A1 | 9/2002 | Kroeger |
| 2002/0128889 | A1 | 9/2002 | Kroeger |
| 2002/0133390 | A1 | 9/2002 | Kroeger |
| 2002/0138410 | A1 | 9/2002 | Siska |
| 2002/0143594 | A1 | 10/2002 | Kroeger |
| 2002/0152155 | A1 | 10/2002 | Greenwood et al. |
| 2002/0165723 | A1 | 11/2002 | Kroeger |
| 2002/0194274 | A1 | 12/2002 | Kroeger |
| 2002/0198755 | A1 | 12/2002 | Birkner et al. |
| 2003/0009420 | A1 | 1/2003 | Jones |
| 2003/0018492 | A1 | 1/2003 | Carlson |
| 2003/0018507 | A1 | 1/2003 | Flanagan |
| 2003/0023677 | A1 | 1/2003 | Zuill et al. |
| 2003/0036972 | A1 | 2/2003 | Zamma et al. |
| 2003/0050871 | A1 | 3/2003 | Broughton |
| 2003/0135401 | A1 | 7/2003 | Parr |
| 2003/0135481 | A1 | 7/2003 | Helmes et al. |
| 2003/0156142 | A1 | 8/2003 | Nonaka et al. |
| 2003/0179241 | A1 | 9/2003 | Nonaka et al. |
| 2003/0200168 | A1 | 10/2003 | Cullen, III et al. |
| 2003/0220806 | A1 | 11/2003 | Hoffman et al. |
| 2003/0225587 | A1 | 12/2003 | Mueller |
| 2003/0225748 | A1 | 12/2003 | Haeberle |
| 2003/0233267 | A1 | 12/2003 | Hertel-Szabadi |
| 2003/0233303 | A1 | 12/2003 | Elazouni |
| 2003/0236676 | A1 | 12/2003 | Graham |
| 2003/0236692 | A1 | 12/2003 | Hertel-Szabadi |
| 2004/0054566 | A1 | 3/2004 | J'Maev |
| 2004/0059592 | A1 | 3/2004 | Yadav-Ranjan |
| 2004/0078296 | A1 | 4/2004 | Dykes et al. |
| 2004/0083164 | A1 | 4/2004 | Schwartz et al. |
| 2004/0083165 | A1 | 4/2004 | Lawrence |
| 2004/0088246 | A1 | 5/2004 | Jepsen et al. |
| 2004/0117302 | A1 | 6/2004 | Weichert et al. |
| 2004/0117361 | A1 | 6/2004 | Greer et al. |
| 2004/0153350 | A1 | 8/2004 | Kim et al. |
| 2004/0153366 | A1 | 8/2004 | Olson et al. |
| 2004/0181482 | A1 | 9/2004 | Yap |
| 2004/0186763 | A1 | 9/2004 | Smith |
| 2004/0210470 | A1 | 10/2004 | Rusk |
| 2004/0215633 | A1 | 10/2004 | Harris |
| 2004/0230521 | A1 | 11/2004 | Broadbent et al. |
| 2004/0255266 | A1 | 12/2004 | Dement |
| 2005/0021449 | A1 | 1/2005 | Sweeney |
| 2005/0033690 | A1 | 2/2005 | Antognini et al. |
| 2005/0039115 | A1 | 2/2005 | Gordon et al. |
| 2005/0076213 | A1 | 4/2005 | Conlow |
| 2005/0137931 | A1 | 6/2005 | Janssen |
| 2005/0171790 | A1 | 8/2005 | Blackmon |
| 2005/0182641 | A1 | 8/2005 | Ing et al. |
| 2005/0197856 | A1 | 9/2005 | Drucker |
| 2005/0197953 | A1 | 9/2005 | Broadbent et al. |
| 2005/0204283 | A1 | 9/2005 | Kroeger |
| 2005/0209897 | A1 | 9/2005 | Luhr |
| 2005/0216400 | A1 | 9/2005 | Doyle et al. |
| 2005/0222923 | A1 | 10/2005 | Lambright |
| 2005/0222942 | A1 | 10/2005 | Pheil et al. |
| 2006/0010005 | A1 | 1/2006 | Rowland |
| 2006/0173775 | A1 | 8/2006 | Cullen, III et al. |
| 2007/0288334 | A1 | 12/2007 | Creedle et al. |
| 2011/0016044 | A1* | 1/2011 | Shapiro et al. .................. 705/40 |

OTHER PUBLICATIONS

Construction Monitoring Systems LLC, "Questions & Answers", Welcome to AccuDraw, Available Online at: <http://accudraw.com/QandA.asp?UPK=&LoD=&LoT=&EID=&SID=>, pp. 1-2, Retrieved Jun. 9, 2004.

Construction Monitoring Systems LLC, "AccuDraw, An AD Network Product", Lender Page, Available Online at: <http://accudraw.com/LenderPage.asp>, pp. 1-3, Retrieved Jun. 9, 2004.

Construction Monitoring Systems LLC, "AccuDraw, An AD Network Product", Processor Page, Available Online at: <http://accudraw.com/ProcessorPage.asp>, pp. 1-3, Retrieved Jun. 9, 2004.

Construction Monitoring Systems LLC, "AccuDraw, An AD Network Product", Builder Page, Available Online at: <http://accudraw.com/BuilderPage.asp>, pp. 1-3, Retrieved Jun. 9, 2004.

Construction Monitoring Systems LLC, "Contact", Welcome to AccuDraw, Available Online at: <http://accudraw.com/contact.asp>, p. 1, Retrieved Jun. 9, 2004.

Construction Monitoring Systems LLC, "Request Info.", Welcome to AccuDraw, Available Online at: <http://accudraw.com/RequestInfo.asp?UPK=&LoD=&LoT-&EID=&SID=>, p. 1, Retrieved Jun. 9, 2004.

Construction Monitoring Systems LLC, AccuDraw Explored Guide Cover Letter, p. 1.

Construction Monitoring Systems LLC, AccuDraw Explored Guide, Available Online at: <https://accudraw.com/AccuDraw%20EXPLORED%20web%20version.htm>, pp. 1-17, Retrieved Feb. 21, 2006.

Construction Monitoring Systems LLC, "CMS/AccuDraw Processor Manual", pp. 1-10.

Construction Monitoring Systems LLC, "Your Agenda Screen Shot", Welcome to AccuDraw, Available Online at: <https://accudraw.com/agenda.asp?UPK=287&LoD=13596&LoT=33953&EID=38664. 763587963.706538&SID=106> p. 1, Retrieved Feb. 28, 2006.

Construction Monitoring Systems LLC, "Draw Details Screen Shot", Welcome to AccuDraw, Available Online at: <https://accudraw.com/DrawApproval2.asp?UPK=287&LoD=13596&LoT=33953 &EID=38664.763587963.706538&SID=106&PID=38820. 3345023148.312131&CD=1>, pp. 1-2, Retrieved Feb. 28, 2006.

Construction Monitoring Systems LLC, "User Information Screen Shot", Welcome to AccuDraw, Available Online at: <https://accudraw.com/userinfo.asp?UPK=287&LoD=13596&33953 &EID=38664.763587963.706538&SID=106>, p. 1, Retrieved Feb. 28, 2006.

Construction Monitoring Systems LLC, "AccuDraw: Construction Loan Monitoring Software for the Financial Services Industry", AccuDraw Brochure, pp. 1-2.

Constructsure, ConstructSure Risk Management, Inspection, Fund Control, and Estimating Services, Available Online at: <http://www.econstructsure.com/solutions.htm> p. 1, Retrieved Jun. 9, 2004.

Constructsure, "New Program Release—Construction Renovation Bond Program", ConstructSure Risk Management, Inspection, Fund Control, and Estimating Services, Available Online at: <http://www.econstructsure.com/bond_index.htrn>, pp. 1-2, Retrieved Jun. 9, 2004.

Constructsure, "Our Mission", ConstructSure Risk Management, Inspection, Fund Control, and Estimating Services, Available Online at: <http://www.econstructsure.com/mission.htm>, p. 1, Retrieved Jun. 9, 2004.

Constructsure "About ConstructSure", ConstructSure Risk Management, Inspection, Fund Control, and Estimating Services, Available Online at: <http://www.econstructsure.com/company.htm>, pp. 1-2, Retrieved Jun. 9, 2004.

Constructsure, "Our Team", ConstructSure Risk Management, Inspection, Fund Control, and Estimating Services, Available Online at: <http:www.econstructsure.com/team.htm> pp. 1-3, Retrieved Jun. 9, 2004.

Constructsure, "Our Customers", ConstructSure Risk Management, Inspection, Fund Control, and Estimating Services, Available Online at: <http://www.econstructsure.com/customers.htm>, p. 1, Retrieved Jun. 9, 2004.

Constructsure, "Our Partners", ConstructSure Risk Management, Inspection, Fund Control, and Estimating Services, Available Online at: <http://www.econstructsure.com/partners.htm>, p. 1, Retrieved Jun. 9, 2006.

Cortexion Inc, Cortexion, Inc—Financial Project Management, Available Online at: <http://www.cortexion.com/Default.aspx>, p. 1, Retrieved Jun. 22, 2006.

Cortexion Inc, "Implementing the Cortexion System", Cortexion, Inc.—Implementation, Available Online at: <http://www.cortexion.com/Implementation.aspx>, p. 1, Retrieved Jun. 22, 2006.

Cortexion Inc, "Cortexion Provides a Unique and Valuable Service to Project Owners and Lenders", Cortexion Inc.—Services, Available Online at: <http://www.cortexion.com/Services.aspx>, pp. 1-2, Retrieved Jun. 22, 2006.

Cortexion Inc, "Banks & Lenders", Cortexion Inc.—Benefits for Banks, Available Online at: <http://www.cortexion.com/Popups/Banks.aspx>, p. 1, Retrieved Jun. 22, 2006.

Cortexion Inc, "Project Owners", Cortexion Inc.—Benefits for Project Owners, Available Online at: <http://www.cortexion.com/Popups/Owners.aspx>, p. 1, Retrieved Jun. 22, 2006.

Cortexion Inc, "Design Professionals", Cortexion Inc—Benefits for Design Professionals, Available Online at: <http://www.cortexion.com/Popups/Designers.aspx>, p. 1, Retrieved Jun. 22, 2006.

Cortexion Inc, "General Contractors", Cortexion Inc.—Benefits for General Contractors, Available Online at: <http://www.cortexion.com/Popups/GeneralContractors.aspx>, p. 1, Retrieved Jun. 22, 2006.

Cortexion Inc, "Subcontractors", Cortexion Inc.—Benefits for Subcontractors, Available Online at: <http://www.cortexion.com/Popups/Subcontractors.aspx>, p. 1, Retrieved Jun. 22, 2006.

Cortexion Inc, "Suppliers", Cortexion Inc—Benefits for Suppliers—Materials, Equipment, Available Online at: <http://www.cortexion.com/Popups/Suppliers.aspx>, p. 1, Retrieved Jun. 22, 2006.

Cortexion Inc, "Rental Yards", Cortexion Inc.—Benefits for Rental Yards, Available Online at: <http://www.cortexion.com/Popups/RentalYards.aspx>, p. 1, Retrieved Jun. 22, 2006.

Cortexion Inc, "Guaranteed Savings", Cortexion Inc.—Guaranteed Savings, Available Online at: <http://www.cortexion.com/Savings.aspx>, p. 1, Retrieved Jun. 22, 2006.

Cortexion Inc, "Reduction of Risk", Cortexion Inc.—Reduction of Risk, Available Online at: <http://www.cortexion.com/Risk.aspx>, p. 1, Retrieved Jun. 22, 2006.

Cortexion Inc, "No Upfront Costs", Cortexion Inc.—No Upfront Costs, Available Online at: <http://www.cortexion.com/Costs.aspx>, p. 1, Retrieved Jun. 22, 2006.

Cortexion Inc, "Better Project Control", Cortexion Inc.—Better Project Control, Available Online at: <http://www.cortexion.com/ProjectControl.aspx>, p. 1, Retrieved Jun. 22, 2006.

Cortexion Inc, "Schedule Control", Cortexion Inc.—Schedule Control, Available Online at: <http://www.cortexion.com/ScheduleControl.aspx>, p. 1, Retrieved Jun. 22, 2006.

Cortexion Inc, Easy to Use:, Cortexion Inc.—Easy to Use, Available Online at: <http:www.cortexion.com/Easy.aspx>, p. 1, Retrieved Jun. 22, 2006.

Cortexion Inc, "Better Visibility", Cortexion Inc—Better Visibility, Available Online at: <http://www.cortexion.com/Visibility.aspx>, p. 1, Retrieved Jun. 22, 2006.

Cortexion Inc, "High Team Morale", Cortexion Inc.—High Team Morale, Available Online at: <http://www.cortexion.com/Morale.aspx>, p. 1, Retrieved Jun. 22, 2006.

Cortexion Inc, "The Cortexion Team is Dedicated to Eliminating Inefficiencies in Construction Financing and Project Management", Cortexion Inc—About Us, Available Online at: <http://www.cortexion.com/AboutUs.aspx>, pp. 1-2, Retrieved Jun. 22, 2006.

Eclectus Inc, Construction Industry Management and Planning Software—ECL Software, Available Online at: <http://www.eclectusinc.com/>, p. 1, Retrieved Jun. 9, 2004.

Eclectus Inc, "Products", CMIS, Home Construction Accounting, Estimating, Management and Payroll Software—ECL Software, Available Online at: <http://www.eclectusinc.com/cmis.html>, p. 1, Retrieved Jun. 30, 2004.

Eclectus Inc, Construction Industry Management Information System, Fund Control Software and Public Safety—ECL Software, Available Online at: <http://www.eclectusinc.com/products.html>, p. 1, Retrieved Jun. 9, 2004.

Electus Inc, "Fund Control", Fund Control Banking Software—ECL Software, Available Online at: <http://www.eclectusinc.com/fc.html>, pp. 1-2, Retrieved Jun. 9, 2004.

Emerging Solutions Inc, "Constructware. Communication. Collaboration. Control.", Constructware Home Page, Available Online at: <http://www.constructware.com>, pp. 1-2, Retrieved Jan. 18, 2006.

Expesite Inc, "Features and Benefits", Web Based Project Management Software Project Management System, Available Online at: <http://www.expesite.com/homepage/products_services/products_services.asp>, pp. 1-2, Retrieved Jul. 3, 2007.

Expesite Inc, "Project Fact Sheet and Corporate Fact Sheet", Media Kit, Available Online at: <http://www.expesite.com/homepage/press/mediakit.pdf>, pp. 1-5, Retrieved Jul. 3, 2007.

Expesite Inc, "National Companies Sign Up for Online Project Management", Expesite—Collaboration Program Management, Available Online at: <http://www.expesite.com/homepage/press/2002_2003/nationalcompanies.asp>, p. 1, Jan. 28, 2002.

Expesite Inc, "Expesite Rolls Our New Cost Tracking Tool in Latest Release", Expesite—Collaboration Program Management, Available Online at: <http://www.expesite.com/hompage/press/2004/version50.asp>, p. 1, Jan. 6, 2003.

Expesite Inc, "Expesite Releases New Version of Web-Based Project Management Tool", Expesite—Collaberation Program Management, Available Online at: <http://www.expesite.com/hompage/press/2006/newreleasejam.asp>, p. 1, Jan. 6, 2004.

FAS Construction Management Inc, About FAS Graphic, Available Online at: <http://www.fascompanies.com/Products/CMPM/CMPMGraphic.htm>, p. 1, Retrieved Jun. 9, 2004.

FAS Construction Management Inc, FAS CM/PM Text, Available Online at: <http://www.fascompanies.com/Products/CMPM/CMPMText.htm>, p. 1, Retrieved Jun. 9, 2004.

FAS Construction Management Inc, About FAS Graphic, Available Online at: <http://www.fascompanies.com/Products/CRM/CRMGraphic.htm>, p. 1, Retrieved Jun. 9, 2004.

FAS Construction Management Inc, FAS CRM Text, Available Online at: <http://www.fascompanies.com/Products/CRM/CRMText.htm>, p. 1, Retrieved Jun. 9, 2004.

FAS Construction Management Inc, "About FAS Construction Management", About FAS Title, Available Online at: <http://www.fascompanies.com/About%20FAS/AboutTitle.htm>, p. 1, Retrieved Jun. 9, 2004.

FAS Construction Managment Inc, About FAS Graphic, Available Online at: <http://www.fascompanies.com/About%20FAS/AboutGraphic.htm>, p. 1, Retrieved Jun. 9, 2004.

FAS Construction Management Inc, About FAS Text, Available Online at: <http://www.fascompanies.com/About%20FAS/About-Text.htm>, p. 1, Retrieved Jun. 9, 2004.

Gradebeam LLC, "Welcome to GradeBeam", GradeBeam—Home, Available Online at : <http://www.gradebeam.com/>, p. 1, Retrieved Sep. 15, 2004.

Gradebeam LLC, "GradeBeam Frequently Asked Questions", GradeBeam—FAQ's, Available Online at: <http://www.gradebeam.com/faq.html>, pp. 1-4. Retrieved Sep. 15, 2004.

Gradebeam LLC, "GradeBeam, Construction Communication System", Slideshow, Available Online at: <http://www.gradebeam.com/presentation.pps>, pp. 1-17, Retrieved Sep. 15, 2004.

Gradebeam LLC, "About Us", GradeBeam—About Us, Available Online at: <http://www.gradebeam.com/main/aboutus.asp>, pp. 1-2. Retrieved Sep. 15, 2004.

Gradebeam LLC, "User Agreement", GradeBeam—User Agreement, Available Online at: <http://www.gradebeam.com/main/useragreement.asp>, pp. 1-8, Retrieved Sep. 15, 2004.

Harland Financial Solutions Inc, "Harland Financial Solutions Mortgage Solutions", Mortgage Solutions, Available Online at: <http://www.harlandfs.com/ProductsAndServices/MortgageSolutions.asp>, pp. 1-2, Retrieved Dec. 7, 2006.

Harland Financial Solutions Inc, "Harland—Point of Sale", Point of Sale, Available Online at: <http://www.harlandfs.com/ProductsAndServices/pointofsale.asp>, pp. 1-2, Retrieved Dec. 7, 2006.

Harland Financial Solutions Inc, "Harland—Point of Sale", Interling E3 Origination Client, Available Online at: <http://www.harlandfs.com/ProducstAndServices/pointofsale.asp?ID=292>, pp. 1-2, Retrieved Dec. 7, 2006.

Harland Financial Solutions Inc, "Interlinq E3 Origination Client", Product Brochure, Available Online at: <http://www.harlandfs.com/images/IE3_OrigClient_PS%200906R5.pdf>, pp. 1-2, Retrieved Dec. 7, 2006.

Harland Financial Solutions Inc, "Harland—Point of Sale", Interlinq Entre, Available Online at: <http://www.harlandfs.com/ProductsAndServices/pointofsale.asp?ID=142>, pp. 1-2, Retrieved Dec. 7, 2006.

Harland Financial Solutions Inc, "Interlinq Entre", Product Brochure, Available Online at: <http://www.harlandfs.com/ProductsandServices/images/interlinq/Entre_Brochure.pdf>, pp. 1-4, Retrieved Dec. 7, 2006.

Harland Financial Solutions Inc, "Harland—Point of Sale", Interlinq eMortgageWare, Available Online at: <http://www.harlandfs.com/ProductsAndServices/pointofsale.asp?ID=184>, pp. 1-2, Retrieved Dec. 7, 2006.

Harland Financial Solutions Inc, "Interlinq eMortgageWare", Product Brochure, Available Online at: <http://www.harlandfs.com/ProductsAndServices/images/interlinq/eMW_Brochure.pdf>, pp. 1-4, Retrieved Dec. 7, 2006.

Harland Financial Solutions Inc, "Harland—Mortgage Loan Origination & Production", Mortgage Loan.Origination & Production, Available Online at: <http://www.harlandfs.com/ProductsAndServices/LoanOrigProd.asp>, pp. 1-2, Retrieved Dec. 7, 2006.

Harland Financial Solutions Inc, "Harland—Mortgage Loan Origination & Production", Interlinq E3, Available Online at: <http://www.harlandfs.com/ProductsAndServices/LoanOrigProd.asp?ID=143>, pp. 1-2, Retrieved Dec. 7, 2006.

Harland Financial Solutions Inc, "Interlinq E3", Product Brochure, Available Online at: <http://www.harlandfs.com/ProductsAndServices/images/interlinq/E3_Brochure.pdf>, pp. 1-6, Retrieved Dec. 7, 2006.

Harland Financial Solutions Inc, "Harland—Mortgage Loan Origination & Production", Interlinq MortgageWare, Available Online at: <http://www.harlandfs.com/ProductsAndServices/LoanOrigProd.asp?ID=144>, pp. 1-3, Retrieved Dec. 8, 2006.

Harland Financial Solutions Inc, "Harland—Mortgage Loan Origination & Production", Interlinq PostClosing, Available Online at: <http://www.harlandfs.com/ProductsAndServices/LoanOrigProd.asp?ID=145>, pp. 1-3, Retrieved Dec. 7, 2006.

Harland Financial Solutions Inc, "Harland Financial Solutions—Secondary Marketing", Interlinq Smart, Available Online at: <http://www.harlandfs.com/ProductsAndServices/LoanOrigProd.asp?ID=160>, pp. 1-3, Retrieved Dec. 8, 2006.

Harland Financial Solutions Inc, "Harland—Loan Servicing", Loan Servicing, Available Online at: <http://www.harlandfs.com/ProductsAndServices/LoanServicing.asp>, p. 1, Retrieved Dec. 7, 2006.

Harland Financial Solutions Inc, "Harland—Loan Servicing", Interlinq Loan Servicing, Available Online at: <http://www.harlandfs.com/ProductsAndServices/LoanServicing.asp?ID=150>, pp. 1-2, Retrieved Dec. 7, 2006.

Harland Financial Solutions Inc, "Interlinq Loan Servicing", Product Brochure, Available Online at: <http://www.harlandfs.com/ProductsAndServices/images/interlinq/LS_Brochure.pdf>, pp. 1-6, Retrieved Dec. 7, 2006.

Harland Financial Solutions Inc, "Harland—Loan Servicing", Interlinq BuilderBlocks, Available Online at: <http://www.harlandfs.com/ProductsAndServices/LoanServicing.asp?ID=148>, pp. 1-2, Retrieved Dec. 8, 2006.

Harland Financial Solutions Inc, "Interlinq BuilderBlock$", Product Brochure, Available Online at: <http://www.harlandfs.com/ProductsAndServices/images/interlinq/BBlocksBrochure.pdf>, pp. 1-4, Retrieved Dec. 8, 2006.

Harland Financial Solutions Inc, Harland Financial Solutions, Available Online at: <http://www.harlandfinancialsolutions.com/>, p. 1, Retrieved Jun. 9, 2004.

Harland Financial Solutions Inc, "Touche Customer Relationship Management Solution", Harland—Touche Customer Relationship Solution, Available Online at: <http://www.harlandfinancialsolutions.com/ProductsAndServices/Touche.asp>, p. 1, Retrieved Jun. 9, 2004.

Harland Financial Solutions Inc, "Touche Analyzer", Harland Financial Solutions—Touche Analyzer, Available Online at: <http://www.harlandfinancialsolutions.com/ProductsAndServices/Analyzer.asp?IE=156>, pp. 1-2, Retrieved Jun. 9, 2004.

Harland Financial Solutions Inc, "Touche Messenger", Harland—Touche Messenger, Available Online at: <http://www.harlandfinancialsolutions.com/ProductsAndServices/Messenger.asp?ID=157>, pp. 1-2, Retrieved Jun. 9, 2004.

Harland Financial Solutions Inc, "Expert Series Tools", Harland—Expert Series Tools, Available Online at: <http://www.harlandfinancialsolutions.com/ProductsAndServices/Expert.asp>, p. 1, Retrieved Jun. 9, 2004.

Harland Financial Solutions Inc, "Analytical Tools", Harland—Analytical Tools, Available Online at: <http://www.harlandfinancialsolutions.com/ProductsAndServices/Analysis.asp>, p. 1, Retrieved Jun. 9, 2004.

Harland Financial Solutions Inc, "Touche Advisor Data Enhancement Services", Harland—Data Enhancement, Available Online at: <http://www.harlandfinancialsolutions.com/ProductsAndServices/InformationServices.asp>, pp. 1-2, Retrieved Jun. 9, 2004.

Hart Business Solutions LLC, "Overview", GCPay Help Text, Available Online at: <http://www.gcpay.com/images/GCPay_HelpMain.html>, pp. 1-35, Retrieved Nov. 14, 2005.

Hart Business Solutions LLC, "GCPay Customer Feedback", GCPay Testimonials, Available Online at: <http://www.gcpay.com/testimonials.jsp>, p. 1, Retrieved Dec. 16, 2005.

Hart Business Solutions LLC, "About GCPay", About GCPay, Available Online at: <http://www.gcpay.com/aboutGCPay.jsp>, pp. 1-2, Retrieved Dec. 16, 2005.

Hart Business Solutions LLC, GCPay Slideshow, Available Online at: <http://www.gcpay.com/images/slides/Slide[1b-15b].gif>, pp. 1-15, Retrieved Dec. 16, 2006.

Hart Business Solutions LLC, "Hart Business Solutions to Unveil GCPay at Sage Summit", Press Release, p. 1, Oct. 25, 2005.

Hart Business Solutions LLC, "Maximizing Construction Billing Efficiency and Accuracy: The Integrated Payment Application Mandate", pp. 1-7, Jul. 2004.

Hart Business Solutions LLC, "Accelerate Your Progress Payment Applications", GCPay Brochure, pp. 1-2.

Jobpac International Systems Pty Ltd, Jobpac—Home, Available Online at: <http://www.jobpac.com.au>, p. 1, Retrieved Jan. 18, 2006.

Kelly, J., "A Better Building? Well, A Better Way to Pay for It." Richmond Times Dispatch, pp. D-7, Richmond Newspapers Inc., May 22, 2005.

LandAmerica Financial Group Inc, "Contact", Welcome to SafeDraw, Available Online at: <http://www.safedraw.com/contact.asp?UPK=&LoD=&LoT=&EID=&SID=>, p. 1, Retrieved Jun. 9, 2004.

LandAmerica Financial Group, Inc, "Request Info.", Welcome to SafeDraw, Available Online at: <http://www.safedraw.com/RequestInfo.asp?UPK=&LoD=&LoT=&EID=&SID=>, p. 1, Retrieved Jun. 9, 2004.

LandAmerica Financial Group Inc, "Login", Welcome to SafeDraw, Available Online at: <http://www.safedraw.com/login.asp>, pp. 1-2, Retrieved Jun. 9, 2004.

LandAmerica Financial Group Inc, "About AD Logo", Welcome to SafeDraw, Available Online at: <http://www.safedraw.com/aboutAccuDraw.asp?UPK=LoD-&LoT=&EID=&SID=>, p. 1, Retrieved Jun. 9, 2004.

LandAmerica Financial Group Inc, "Questions & Answers" Welcome to SafeDraw, Available Online at: <http://www.safedraw.com/QandA.asp?UPK=&LoD=&LoT=&EID=&SID=>, pp. 1-2, Retrieved Jun. 9, 2004.

LandAmerica Financial Group Inc, "Terms", Welcome to SafeDraw, Available Online at: <http://www.safedraw.com/safedraw_terms_out.asp?UPK=&LoD=&LoT=&EID=&SID=>, pp. 1-4, Retrieved Jun. 9, 2004.

Macomber Builders Kicks Off Second Century of Construction Excellence With Computer Methods, PR Newswire, New York, p. 1, Apr. 22, 2004.

Primavera Systems Inc, Primavera Systems, Inc.—Project and Portfolio Management, Available Online at: <http://www.primavera.com>, p. 1, Retrieved Jan. 18, 2006.

Rawlins, Gordon C, "Construction ERP Software: Balancing Data Between Finance & the Field", CFMA BP, pp. 77-78 & 81-82, Sep.-Oct. 2004.

Sacke & Associates Inc, "Computer Methods International Corp. Appoints Sacke & Associates Inc. as its North American Public Relations Agency of Record", Company News, Available Online at: <http://www.sackepr.com/SackeCMiAug28-2003.html>, pp. 1-2, Aug. 28, 2003.

SafeDocs, "About SafeDocs", About SafeDocs, Available Online at: <http://www.sfdocs.com/about.html> pp. 1-2, Retrieved Jun. 9, 2004.

SafeDocs, SafeDocs Home, Available Online at: <http://www.sfdocs.com/>, p. 1, Retrieved Jun. 9, 2004.

SafeDocs, Unprecedented Document Security, Available Online at: <http://www.sfdocs.com/feature1_popup.html>, p. 1, Retrieved Jun. 9, 2004.

SafeDocs, "Value Proposition", Turn Days Into Hours, Available Online at: <http://www.sfdocs.com/feature2_popup.html>, p. 1, Retrieved Jun. 9, 2004.

SafeDocs, "Work-Flow", Unlimited Application Options, Available Online at: <http://www.sfdocs.com/feature3_popup.html>, p. 1, Retrieved Jun. 9, 2004.

Wisconsin Builders Association, "The WBA Foundation", Wisconsin Builders Association—Preserving and Promoting the American Dream, Available Online at: <http://www.wbaonline.org/site/content/about/wba.asp>, pp. 1-3, Retrieved Jan. 12, 2005.

Wisconsin Builders Association, "WBA Foundation Donor Funds" Wisconsin Builders Association—Preserving and Promoting the American Dream, Available Online at: <http://www.wisbuild.org/site/content/about/donorfunds.asp>, pp. 1-2, Retrieved Jan. 12, 2005.

Wisconsin Builders Associaton, "Past Presidents", Wisconsin Builders Associaton—Preserving and Promoting the American Dream, Available Online at: <http://www.wbaonline.org/site/content/about/past.asp>, pp. 1-2, Retrieved Jan. 12, 2005.

Wisconsin Builders Association, "Committee Chairs", Wisconsin Builders Association—Preserving and Promoting the American Dream, Available Online at: <http://www.wbaonline.org/site/content/about/committee.asp>, p. 1, Retrieved Jan. 12, 2005.

Wisconsin Builders Association, "Board of Directors", Wisconsin Builders Association—Preserving and Promoting the American Dream, Available Online at: <http://www.wbaonline.org/site/content/about/board.asp> pp. 1-6, Retrieved Jan. 12, 2005.

Wisconsin Builders Association, "About Wisconsin Builders Association" Wisconsin Builders Association—Preserving and Promoting the American Dream, Available Online at: <http://www.wbaonline.org/site/content/about/>, p. 1, Retrieved Jan. 12, 2005.

Wisconsin Builders Association, "Frequently Asked Questions", WBA Foundation, Available Online at: <http://www.wisbuild.org/pdfs/FAQ.pdf>, pp. 1-2, Retrieved Jan. 12, 2005.

Wisconsin Builders Association, "Fund Creation and Management Policy", WBA Foundation, Available Online at: <http://www.wisbuild.org/pdfs/policysht.pdf>, pp. 1-2, Retrieved Jan. 12, 2005.

Wisconsin Builders Association, "Code of Ethics", WBA Foundation, Available Online at: <http://www.wisbuild.org/pdfs/codethic.pdf>, p. 1, Retrieved Jan. 12, 2005.

Wisconsin Builders Association, "Bylaws", Available Online at: <htip://www.wisbuild.org/pdfs/WBAbylaws2004.pdf>, pp. 1-7, Sep. 2004.

Wisconsin Builders Association, "Donation Types", WBA Foundation, Available Online at: <http://www.wisbuild.org/pdfs/dontypes.pdf>, p. 1, Retrieved Jan. 12, 2005.

Wisconsin Builders Association, "2003-2004 Legislative Session: in Review", Available Online at: <http://www.wisbuild.org/pdfs/0304policyupdt.pdf>, pp. 1-4, Jul. 2004.

Wisconsin Builders Association, "Policy Agenda", Wisconsin Builders Association—Preserving and Promoting the American Dream, Available Online at: <http://www.wbaonline.org/site/content/government/policy.asp>, p. 1, Retrieved Jan. 12, 2005.

Wisconsin Builders Association, "Resource Center", Wisconsin Builders Association—Preserving and Promoting the American Dream, Available Online at: <http://www.wbaonline.org/site/content/resource/index.asp>, p. 1, Retrieved Jan. 12, 2005.

Wisconsin Builders Association, "Call to Action", Wisconsin Builders Association—Preserving and Promoting the American Dream, Available Online at: <http://www.wbaonline.org/site/content/government/call.asp>, p. 1, Retrieved Jan. 12, 2005.

Wisconsin Builders Association, "Helpful Links", Wisconsin Builders Association—Preserving and Promoting the American Dream, Available Online at: <http://www.wbaonline.org/site/content/resource/helpfuL.asp>, pp. 1-5, Retrieved Jan. 12, 2005.

Wisconsin Builders Association, "Press Releases", Wisconsin Builders Association—Preserving and Promoting the American Dream, Available Online at: <http://www.wbaonline.org/site/content/resource/press.asp>, pp. 1-2, Retrieved Jan. 12, 2005.

Wisconsin Builders Association, "Construction Data", Wisconsin Builders Association—Preserving and Promoting the American Dream, Available Online at: <http://www.wbaonline.org/site/content/resource/construction.asp>, pp. 1-2, Jan. 12, 2005.

Wisconsin Builders Association, "Consumer Information" Wisconsin Builders Association—Preserving and Promoting the American Dream, Available Online at: <http://www.wbaonline.org/site/content/resource/consumer.asp>, p. 1, Retrieved Jan. 12, 2005.

Wisconsin Builders Association, "Publications", Wisconsin Builders Association—Preserving and Promoting the American Dream, Available Online at: <http://www.wbaonline.org/site/content/resource/publications.asp> p. 1, Jan. 12, 2005.

Wisconsin Builders Association, "Contact Us", Wisconsin Builders Association—Preserving and Promoting the American Dream, Available Online at: <http://www.wbaonline.org/site/content/contact/>, pp. 1-3, Retrieved Jan. 12, 2005.

Wisconsin Department of Administration: Division of State Facilities, "List of Projects Out for Bid", Wisbuild DSF Information System, Available Online at: <http://www.wisbuild.doa.state.wi.us/dfd/dfd_reports/bid_list_public.asp>, pp. 1-4, Jan. 12, 2005.

Zoellick, Bill, "Electronic Signatures—Commentary on the Electronic Signatures in Global and National Commerce Act", Fastwater Library B2B Economy, Available Online at: <www.fastwater.com/Library/B2BEconomy/DigitalSigs/DigSig-Commentary-fr.php3>, pp. 1-11, 2000.

* cited by examiner

ENTER INVOICE DETAILS

Project: Project Name    401
Contract No: 0001-1234-00    403
Date: April 4, 2008    405

| | % Completed | Scheduled Value | Amount Paid | |
|---|---|---|---|---|
| 123 – Basement Finishing Building Supply Co. | 100.00 | 7,000.00 | 7,000.00 | CHAT |
| 124 – Glass door – Parts Building Supply Co. | 100.00 | 270.00 | 270.00 | CHAT |
| 125 – Glass door – Install Building Supply Co. | 0.00 | 150.00 | 0.00 | CHAT |
| | 97.98 | 7420.00 | 7270.00 | |

407

[Save Changes] 409    [Revert to Saved] 411

CONSTRUCTION PAYMENT MANAGEMENT SYSTEMS AND METHODS WITH SPECIFIED BILLING FEATURES

RELATED APPLICATIONS

The present application claims priority to U.S. Provisional Application No. 60/926,867 filed on Apr. 30, 2007, the entire contents of which is herein incorporated by reference. The present application is also a continuation-in-part of prior-filed co-pending U.S. application Ser. No. 12/061,805 filed on Apr. 3, 2008, the entire contents of which are herein incorporated by reference.

BACKGROUND

General contractors on both large and small construction projects may have requirements to specify invoices/billing for selected subcontractors. According to this practice, known as "specified billing," the general contractor specifies the value of the work completed by a subcontractor directly without input from the subcontractor. Other situations also require a party (e.g., a general contractor, a parent subcontractor, a quantity surveyor, or an owner) to specify the value of the work completed by one or all of the contractors working on the project (e.g., a payee). For example, on some construction projects (such as projects with unit pricing), the payor may hire and/or employ an inspector who "measures" or surveys the units completed for the project and calculates how much will be paid. In these and other situations, the payee and/or the payor may by contract or by practice be given limited or no ability to adjust how much will be paid.

SUMMARY

Some embodiments of the invention provide a payment management system that includes a software enabled user interface accessible by a payor and a payee. The system also includes at least one computer readable memory and a processor. The processor is configured to selectively operate in a specified billing mode in response to a command received from the payor. While operating in the specified billing mode, invoice details are entered by the payor and the generated invoice is presented to the payee for approval. While not operating in the specified billing mode, the payee is able to enter invoice details and the payor is able to approve or reject the invoice. In some embodiments, the processor is configured to notify the payee when specified billing is turned on or off. In some embodiments, the first party and the second party are able to create and transfer additional information such as notes, photographs, video, or audio regarding substantiation of invoice details. In some embodiments, the comments and previous invoice details are saved to the computer readable memory.

Some embodiments of the invention provide a payment management system that includes a software enabled user interface accessible by three parties. The system also includes at least one computer readable memory and a processor. The processor is configured to generate two related invoices—a first invoice between the first and second parties, and a second invoice between the second and third parties. The processor is configured to selectively operate in a specified billing mode for the first invoice and for the second invoice. While operating in the specified billing mode for the first invoice, invoice details are entered by the first party. While not operating in the specified billing mode for the first invoice, invoice details are entered by the second party. Similarly, for the second invoice, invoice details are entered by the second party when specified billing is turned on and by the third party when specified billing is turned off.

In some embodiments, the processor is configured to initiate the second invoice with the specified billing mode turned on and to create invoice details for the second invoice based on the invoice details for the first invoice. In some embodiments, the processor is configured to initiate the first invoice with the specified billing mode turned off and to create invoice details for the first invoice based on the invoice details for the second invoice.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

Construction payment management systems give visual access to a project for the parties involved. Construction payment management systems are described in pending U.S. application Ser. Nos. 12/061,805 and 11/032,699, the entire contents of which are herein incorporated by reference. Embodiments of construction payment management system described herein can incorporate some or all of the features described in the above identified pending U.S. patent applications.

Some of the embodiments described below provide greater flexibility when creating and approving invoices. In some embodiments, the details of an invoice can be entered directly by a payor, a payee, an intermediary contractor, or a third party depending upon the requirements of a given situation. Furthermore, some embodiments allow for multiple parties to enter the details of a single invoice while providing a structured and secure method for approving and recording changes made to the invoice.

Figure 1:
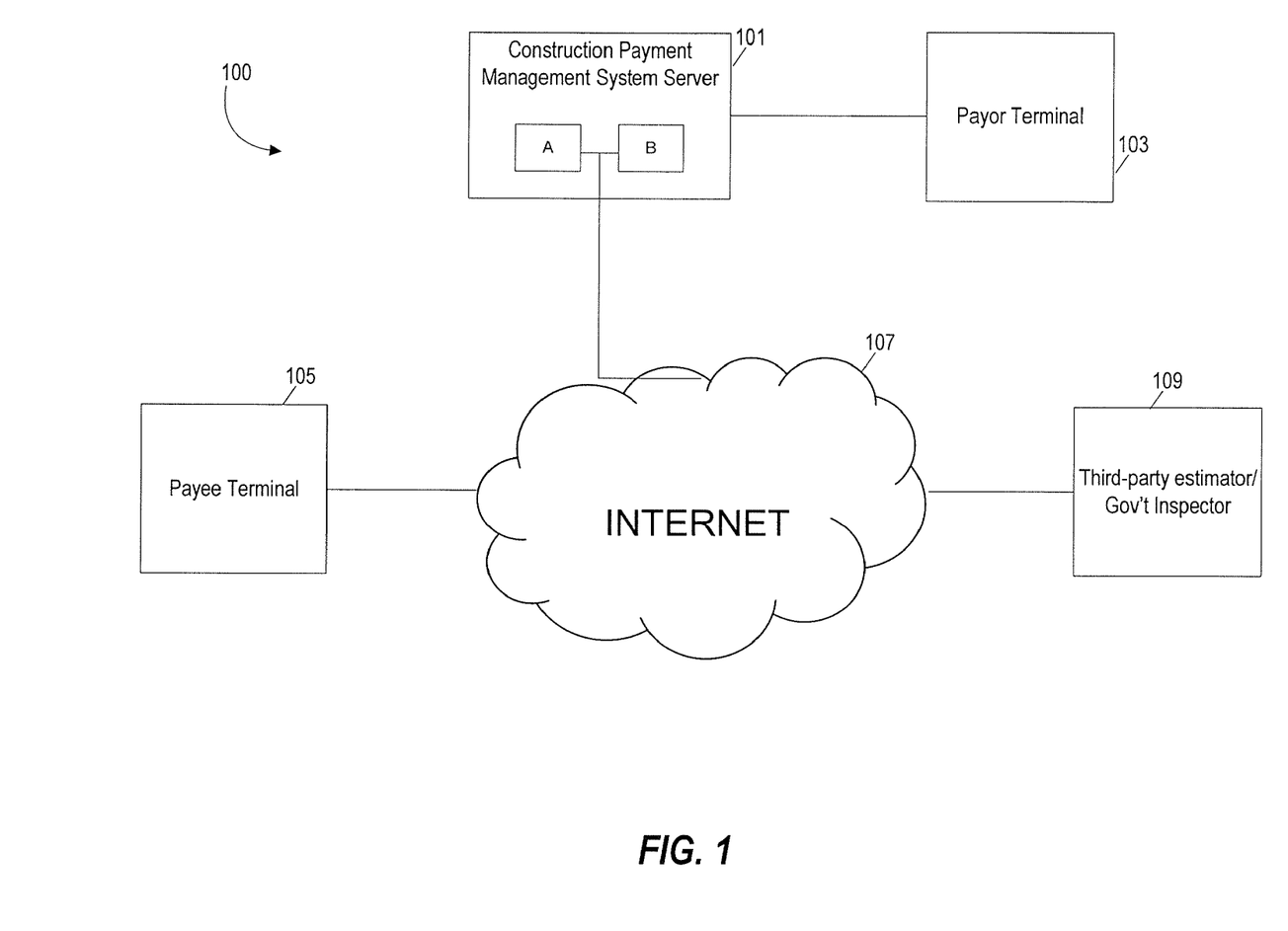
FIG. 1 is a schematic illustration of a construction payment management system according to one embodiment of the invention.

FIG. 1 illustrates a payment management system 100 according to an embodiment of the invention. A server 101 is connected to a payor terminal 103 and a payee terminal 105. The server 101 contains a computer readable memory 101A (e.g., a hard drive) and a processor 101B. The server also includes hardware for connection to a local area network (LAN) and the Internet. The computer readable memory 101A includes stored data related to construction projects managed with the payment management system 100 and program instructions for communicating with other computers through the LAN or the Internet. A web-based user interface is also stored on the computer readable memory 101A and executed on processor 101B such that the web-based user interface can be accessed by other computers.

In some embodiments, the payor and payee terminals 103, 105 are general-purpose personal computers, while in others, they are specialized computers designed specifically for use in the payment management system 100. In this embodiment, the payor terminal 103 is a personal computer containing a hard drive and a CPU. It is connected directly to the server through a local area connection (LAN). The payee terminal 105 is a personal computer with a hard drive and a CPU. It is connected to the server through an Internet connection 107. A web-based user interface is stored on the computer readable memory 101A on the server 101 and is displayed on the payor and payee terminals 103, 105. In other embodiments, the payor and payee terminals 103, 105 can be connected to the server 101 in other ways. For example, both terminals 103, 105 can be connected to the server through the Internet 107.

Additional terminals can also access the server 101. For example, a third party estimator or government inspector can access the server 101 through terminal 109. In some embodiments, access to the server 101 is provided through a web-based user interface. An authorized user can access the server 101 and the payment management system 100 from any computer with Internet access.

Figure 2:
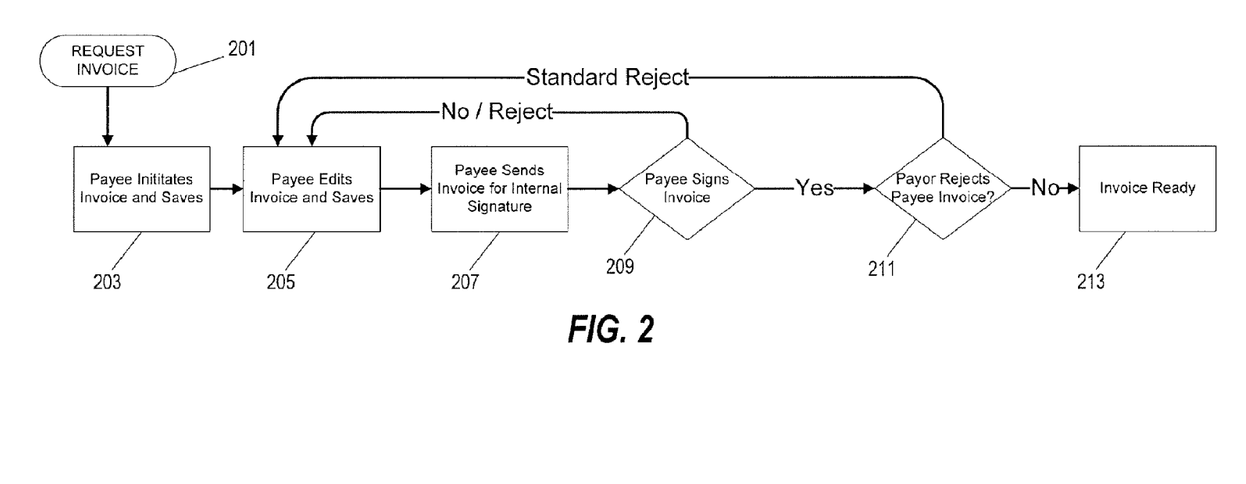
FIG. 2 is a flow chart showing the creation of an invoice with specified billing turned off according to one embodiment of the invention.

FIG. 2 illustrates one example of creating an invoice using the payment management system 100. In this example, the payee such as a subcontractor or general contractor is able to create an invoice based upon the amount that they wish to be paid. This process is generally referred to as "payee-specified billing" or "standard billing."

In FIG. 2, a payor requests an invoice (step 201). The payee creates the invoice (step 203) and enters invoice details (step 205). The system generates an invoice based on the invoice details by placing the details into a formatted template. The invoice is then ready for internal review and a payee signature (step 207). The payee can either view the invoice details in a table format on the terminal user interface or view/print a formatted invoice. If the payee is not satisfied with the invoice, the payee does not sign the invoice (step 209) and makes further changes (step 205). In some embodiments, a time limit or due date is assigned for the payee to submit changes and approve the invoice. Alternatively, if the specified invoice is not signed and returned to the payor before the draw date, the payee will not be paid during that draw.

When the payee is satisfied with the content of the invoice, an electronic signature is submitted (step 209) and the invoice is sent to the payor for review. The payor then either accepts or rejects the invoice (step 211). If the payor is not satisfied with the content of the invoice, the invoice is rejected and returned to the payee for further edits (step 205). Otherwise, the invoice is now ready to continue through the payment process (step 213). After an invoice is ready for payment, the payor can execute and deliver payment manually (e.g., using a check) or the payment management system can be used to effectuate an electronic payment (e.g., through an automated clearing house or electronic funds transfer).

Figure 3:
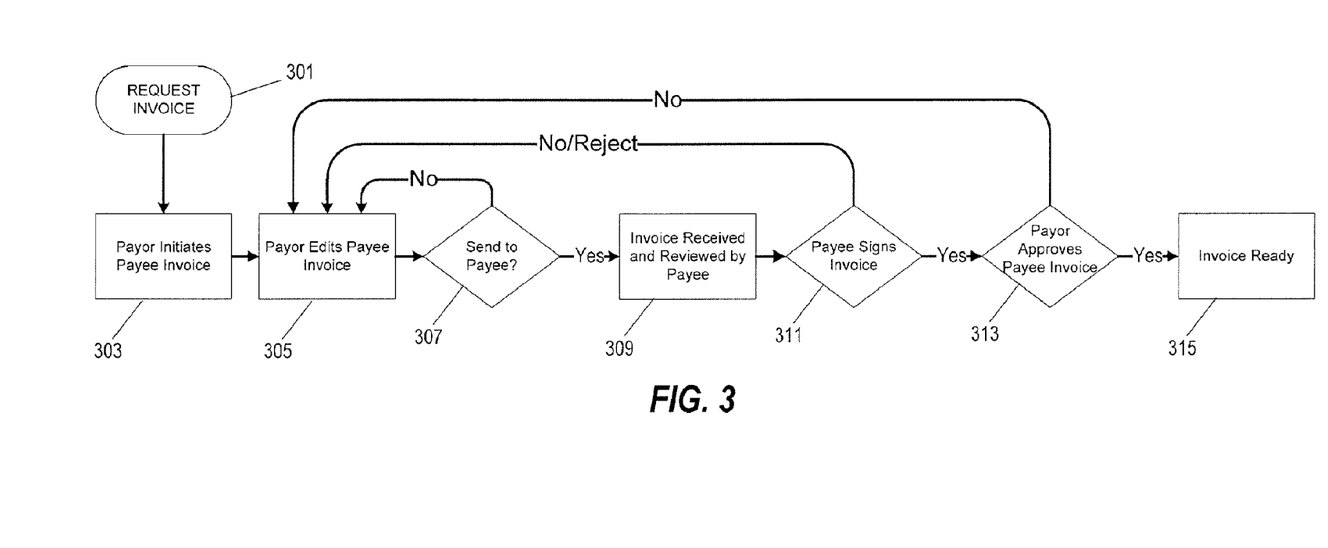
FIG. 3 is a flow chart showing the creation of an invoice with specified billing turned on according to one embodiment of the invention.

FIG. 3 illustrates another example of creating an invoice using the payment management system 100. In this example, the payor, such as a general contractor or a property owner, is able to create an invoice based upon the amount that the payor intends to pay to the payee. This process is generally referred to as "specified billing" or "payor-specified billing."

In this example, when the payor wishes to have an invoice created (step 301), the payor creates the invoice (step 303) and enters the invoice details (step 305). If the payor is satisfied with the content of the invoice, it is sent to the payee (step 307) for review (step 309). However, if the payor is not satisfied with the content of the invoice, the payor may continue to edit the content (step 305). After the invoice is forwarded to and reviewed by the payee (step 309), the payee decides whether to approve or reject the invoice (step 311). If the payee is satisfied, an electronic signature is submitted and the invoice is returned to the payor (step 313). If the payee is not satisfied, the payee rejects the invoice and return it to the payor for further edits (step 305). In this example, the payee is not able to make any changes to the invoice—he can only approve or reject it. When the payee approves and electronically signs the invoice, it is returned to the payor. The payor may still reject the invoice and make further changes to the content (step 305). Otherwise, the invoice is ready to continue through the payment process (step 315).

Embodiments of the payment management system 100 can be configured to conform to the preferred practice of the payor or the geographic region of the project. For example, in some regions, it is common practice to not return signed documents (e.g., invoices or lien waivers) to a payor. The total amount on the specified invoice is the total that the payee will be paid, and payees have no ability to negotiate or reject the invoice. Therefore, some embodiments of the system can also be configured to prohibit a payee from rejecting a specified invoice.

In other situations, a payor delegates the ability to assign a value to be paid in the invoice to a third party (for example, a quantity surveyor). Therefore, some embodiments of the system can be configured to provide a third party with the ability to control the specified billing process. Unless explicitly stated otherwise, the term "specified billing" generally encompasses all situations where someone other than the payee enters the details of the invoice (e.g., "specified billing" as compared to "payee specified billing").

In some embodiments, the specified billing features can be turned on for all subcontractors included in a project or individual subcontractors included in a project. When a subcontractor with specified billing turned on is included in a new draw, the system proceeds as shown in the method of FIG. 3. When specified billing is turned off for a project or for a particular subcontractor, the system proceeds as shown in the method of FIG. 2. As discussed below, the specified billing features in some embodiments can be turned on and off during the creation of a single invoice to allow the parties to collaboratively enter invoice details.

A default specified billing status can be set at a project level. Turning on specified billing sets the default settings for all new subcontractors assigned to that project. As first level subcontracts are created, the general contractor can select to turn specified billing off for a particular subcontractor. In some embodiments, turning specified billing on for a project does not necessarily mean a blanket setting for all subcontractors but only that the specified billing setting is the default setting for the project. This feature can also be provided for sub-of-subcontractors, and the default setting will follow the parent subcontract's specified billing setting.

In both payee specified billing and payor specified billing, the payment management system 100 can be configured to send notifications when certain events occur, such as a newly created invoice, a signed invoice, an initiated payment, etc. When the general contractor has sent the specified invoice for approval, a notification can be sent to the subcontractor (e.g., subcontractor project manager) that includes a link to view the invoice details. The subcontractor can then assign a "Send to Signer" action and the standard process for invoicing through the construction payment management process will take place. The assignment of "action" items are discussed further below.

Figure 4A:
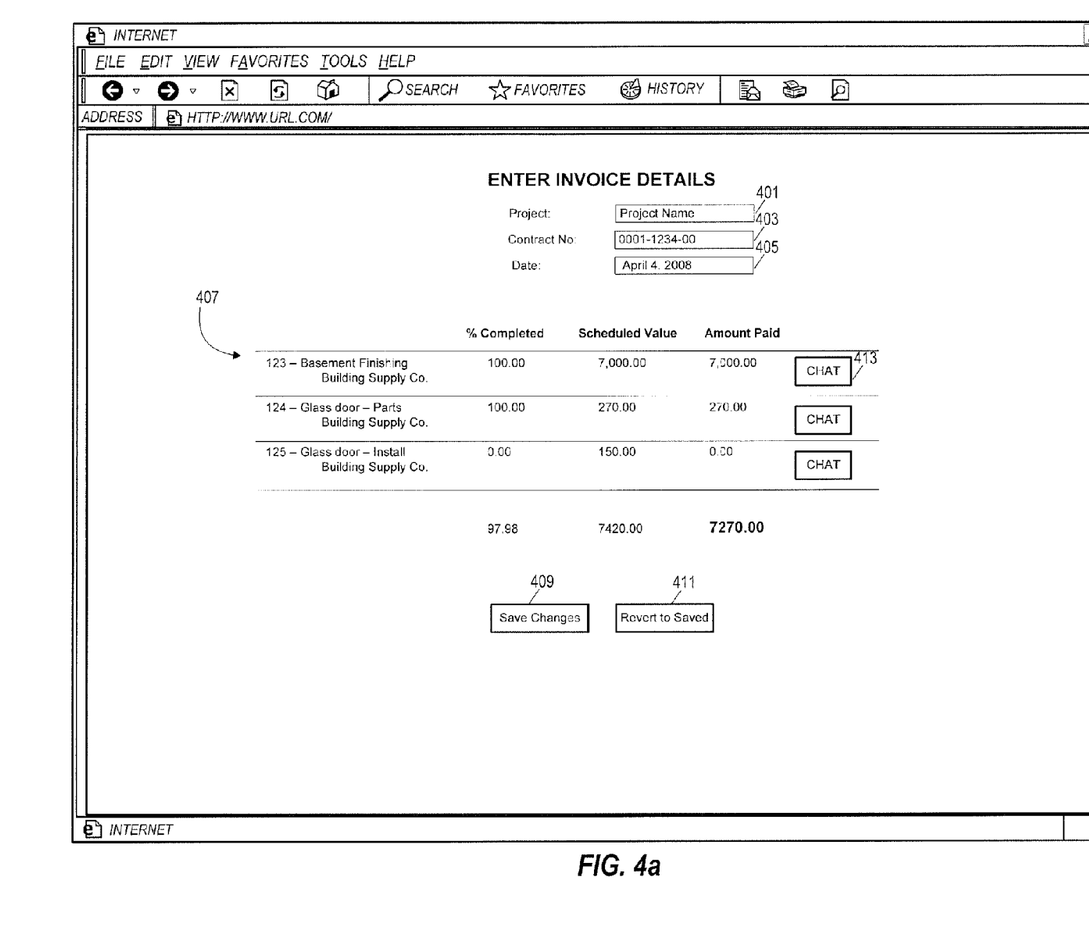
FIG. 4a is a graphical user interface for entering invoice details according to one embodiment of the invention.

FIG. 4a shows the graphical user interface that is presented to a party that is entering the invoice details (e.g., the payee, the payor, or a third party estimator). The user interface of this example includes editable text fields for a project name 401, a contract number 403, and a date 405. Also included is an editable text table 407 containing fields for a billing item/payee name, a percent completed, a scheduled payment value, and an amount to be paid in the invoice. When creating or editing an invoice, these fields can be changed and new entries can be added to the table 407. When finished, the user clicks button 409 to save the changes. Alternatively, the user can click button 411 to discard any changes and revert to the previous version of the invoice.

Some embodiments of the payment management system 100 provide contract-level percentage invoicing instead of the line-item percentage invoicing shown in table 407. To use the contract-level percentage invoicing feature, the party entering the invoice details can enter one percentage value in table 407 that will apply to the entire subcontract. The invoiced amount will be equal to the specified percentage of the entire scheduled value for the subcontract.

Figure 4B:
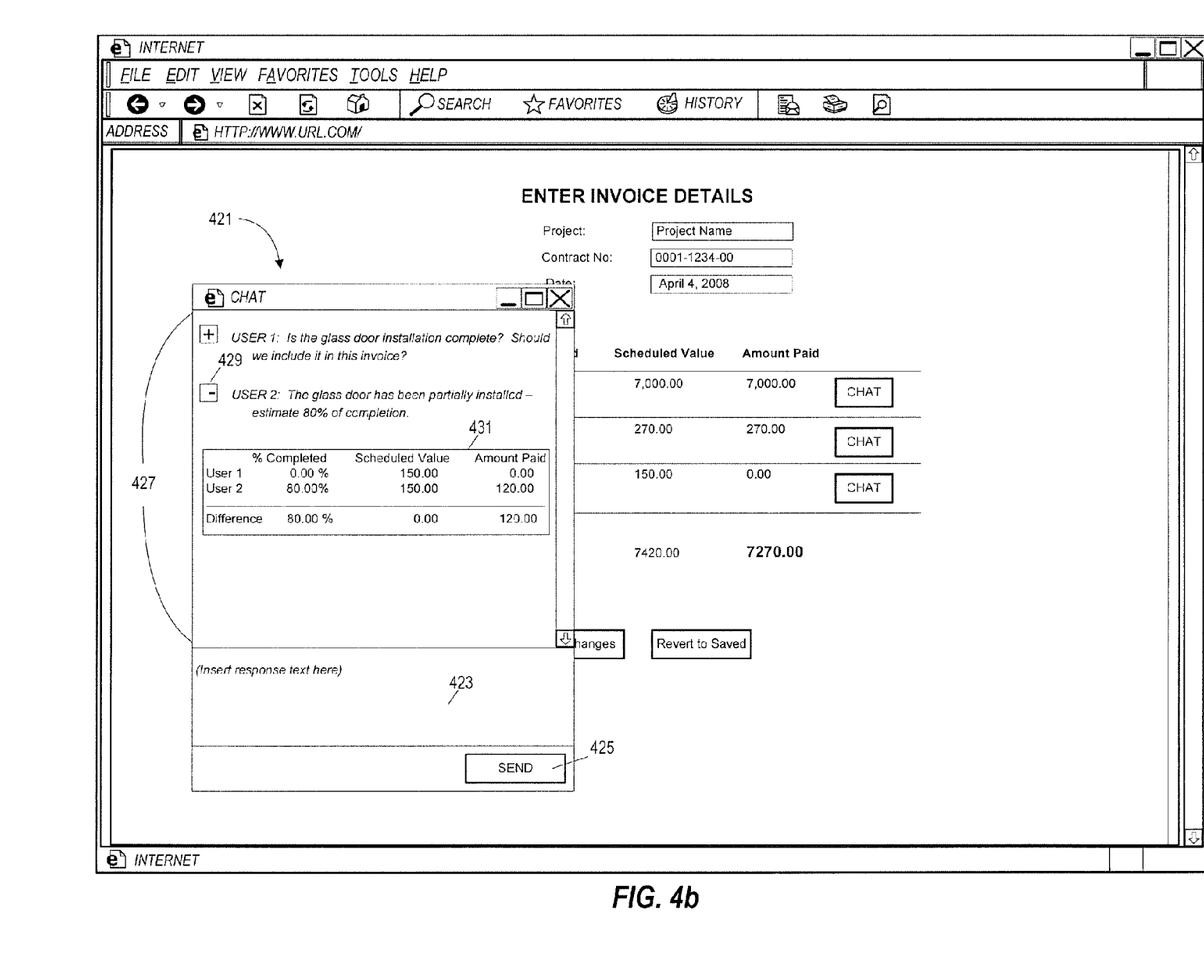
FIG. 4b is the graphical user interface of FIG. 2a with an active comment window.

In the example of FIG. 4a, a general contractor is creating an invoice for a material supplier ("Building Supply Co."). The table 407 includes three entries: basement finishing, glass door—parts, and glass door—installation. For each line item included in table 407, there is a chat button 413. In other embodiments, only a single chat button 413 is provided. By pressing the chat button 413, the user can initiate an asynchronous, text-based communication with another party. FIG. 4b shows a chat window 421 that opens when one of the chat buttons 413 is pressed. The chat window 421 includes a field 423 for entering text, a send button 425, and a display field 427 that shows messages that have been sent or received by the user.

As shown in FIG. 4b, both textual comments and numerical values representative of changes made to the invoice are displayed in display field 427 of chat window 421. Next to each entry is an expand/collapse button 429 (e.g., "+" and "–"). When an entry is expanded (e.g., button 429 is displayed as a "–"), display field 427 includes a table 431 that lists the details of any invoice changes made by a user with the comment. The table 431 shows the previous invoice details, the new invoice details, and the difference between the two. The table 431 also indicates who entered which details.

As discussed above and in further detail below, the specified billing feature can be switched on or off during the creation of an invoice. In the example of FIG. 4b, the specified billing feature is turned off. After USER 1 entered the original invoice details, USER 2 changed the details of the "Glass Door—Install" entry of the invoice from 0% completed to 80% completed. Because the comment from USER 1 is in a collapsed view (as indicated by the "+"), a table 431 is not displayed. Because the comment from USER 2 is in an expanded view, a table 431 shows the details as originally entered by USER 1, the updated details entered by USER 2, and the difference between the two.

In some embodiments, photographs are also transferred using chat window 421 to provide visual evidence of work completed or materials delivered. For example, USER 2 in FIG. 4b can use chat window 421 to send a photograph of the partially completed installation of the glass door to USER 1. In some embodiments, the chat window 421 also facilitates the transfer and receipt of messages or comments recorded in audio (e.g., mp3) or visual (e.g. mpg) forms. In some embodiments, chat window 421 is replaced with a form of real-time communication such as a video or audio conference window.

As described above, the server 101 of the payment management system 100 includes a memory unit 101A that stores the invoice details. In some embodiments, the server also stores a history of changes made to the invoice (e.g., which party made which changes and when) and also stores the content of chat window 421. In some embodiments, this information is stored in the form of a log that allows a user to review the changes and comments that led to the current form of the invoice.

Figure 5:
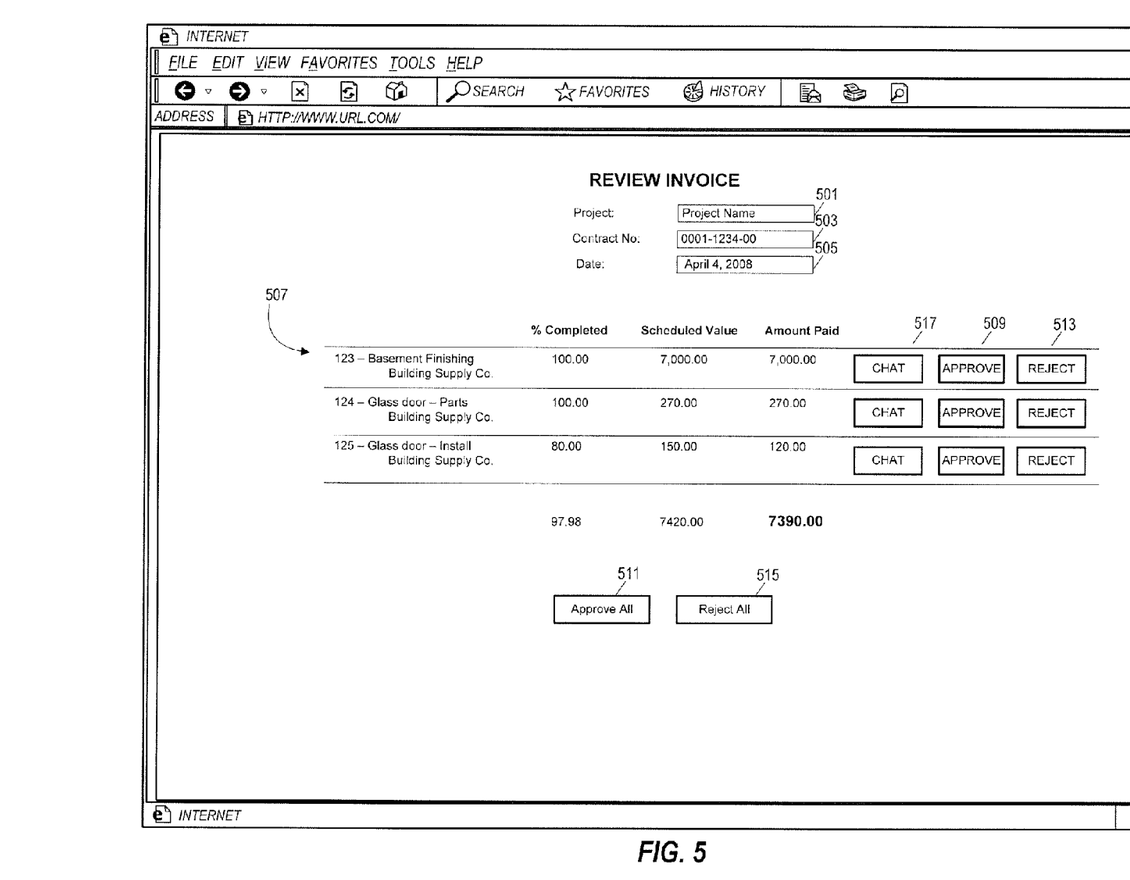
FIG. 5 is a graphical user interface for approving or rejecting a specified invoice.

FIG. 5 shows the graphical user interface that is presented to the party that is reviewing/approving the invoice. In the example of FIG. 3, this can be either the payee at step 309 or the payor at step 313. As in FIG. 4a, the user interface includes fields for a project name 501, a contract number 503, and a date 505. However, because this screen is only for review/approval, these fields are not editable. Similarly, table 507 includes the information that was entered into table 407 (FIG. 4a), but table 507 is not editable. The user can approve an individual item on the invoice by clicking the "approve" button 509 corresponding to the line item. Alternatively, the user can approve the entire invoice by selecting the "approve all" button 511.

As noted above, subcontractors can reject a specified invoice. The user can reject individual line items by selecting the corresponding "reject" button 513 or can reject all of the listed items by selecting the "reject all" button 515. A subcontractor rejecting a specified invoice can also provide a reason for the rejection by using the "chat" button 517. Although FIG. 5 shows a "chat" button 517 associated with each listed item, only a single chat button 517 is provided in other embodiments.

As discussed above, selecting the "chat" button 517 will initiate a real-time text communication with another party (in this case, the party specifying the invoice details). If the other party is not available for "chat," the payment management system 100 informs the other party of the rejection the next time the other party accesses the system. The specifying party is prompted to re-enter the invoice. Negotiations regarding the rejected item can then be conducted using the "chat" button 413 (FIG. 4a) or handled offline.

In some embodiments, the specified billing features may be turned on or off with a draw open and invoices pending. When the specified billing setting is changed, the system reverts to operations associated with the new setting (either from specified billing to standard or the reverse). This change can be applied to a particular invoice, to a particular payee (e.g., subcontractor), or to an entire project.

The specified billing setting can be changed at any time during a project and toggling the specified billing setting changes the setting immediately. When the specified billing setting is changed for a particular subcontractor, all invoices of the subcontractor that have not been sent to a signer can start the invoicing process with the new specified billing setting. Similarly, toggling between the on and off setting for specified billing on a particular contract can cause all invoices that have not been sent to a signer (or been created) to change the workflow to the new setting.

For example, if a general contractor (the payor) begins preparing an invoice for a subcontractor (the payee) using specified billing, the subcontractor will not be able to directly modify the invoice. However, if the general contractor turns specified billing off (i.e., switches to payee specified billing) before the invoice has been approved by the subcontractor, the subcontractor then has the ability to add, remove, or edit invoice details. A notification will be sent to a subcontractor for any change in the specified billing status for the subcontractor in the payment management system 100.

Figure 6:
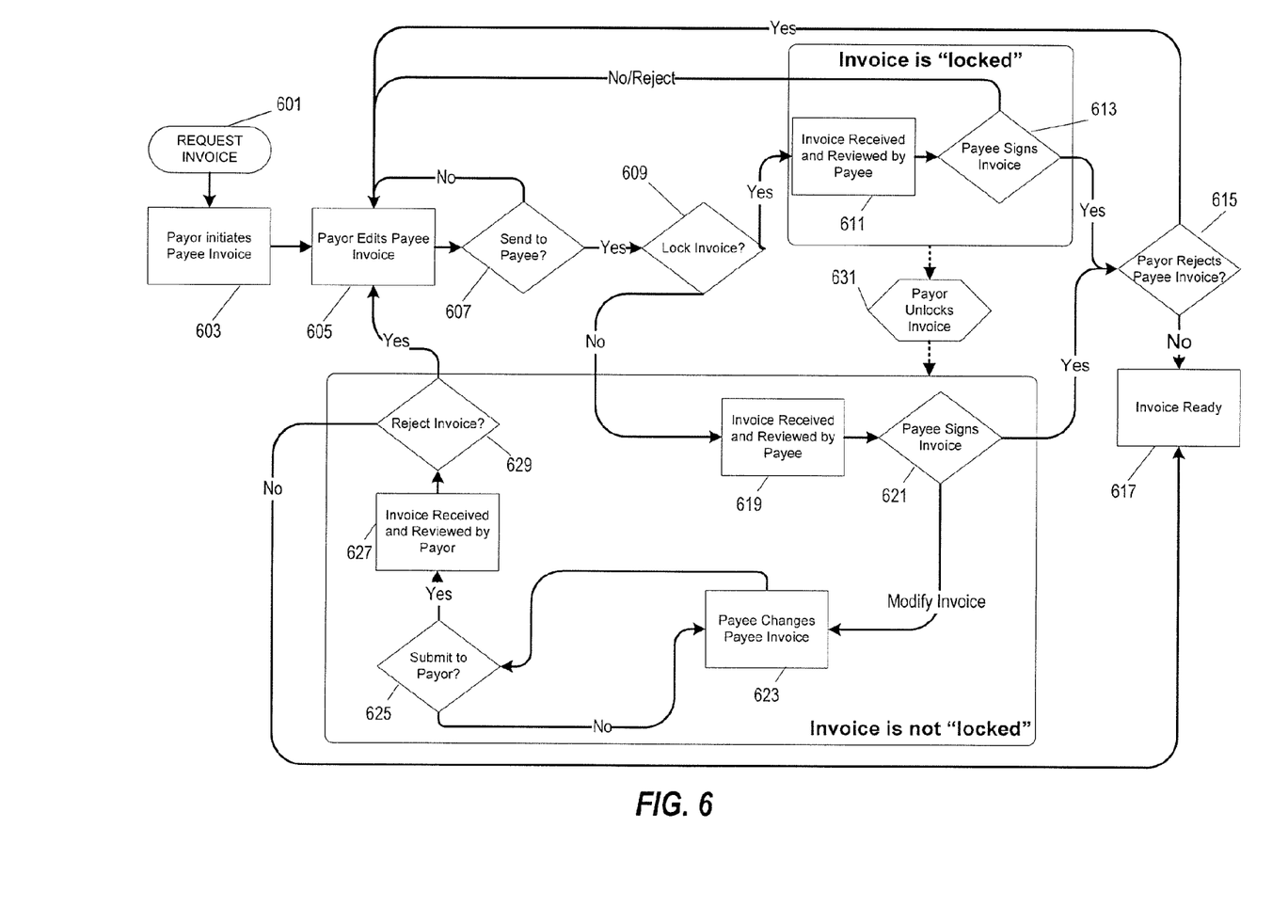
FIG. 6 is a flow chart showing the creation of an invoice initiated by the payor according to one embodiment of the invention where specified billing can selectively be turned on or off.

FIG. 6 illustrates a method of using the payment management system 100 where the specified billing setting is changed during the creation of the invoice. The payor requests an invoice from the system (step 601), initiates the creation of the invoice (step 603), and enters/edits invoice details (step 605). After the payor has entered/edited the details of the invoice, the payor either sends the invoice to the payee (step 607) or saves the invoice without sending it to the payee. If the invoice is not sent, the payor can make further changes to the invoice (step 605).

If the payor is ready to send the invoice to the payee (step 607), the payor makes a determination regarding the specified billing setting. If the payor wishes to use specified billing (i.e., payor-specified billing), a "lock" is placed on the invoice (step 609). The payee is then able to review the invoice details (step 611) and either approve or reject the invoice (step 613). If the payee rejects the invoice, it is sent back to the payor with an instruction to reenter the invoice details along with any comments entered by the payee (e.g., using "chat" button 517). If the payee approves the invoice, an electronic signature is attached (step 613) and the invoice is sent back to the payor (step 615). The payor can still reject the invoice and make further edits (step 605). Otherwise, the invoice is ready to continue through the payment process (step 617).

If the payor wishes to use payee-specified billing, a lock will not be placed on the invoice when it is sent to the payee (steps 607 and 609). The payee again reviews the invoice (step 619) and is presented with an opportunity to attach an electronic signature (step 621). If the payee approves the invoice, it is returned to the payor for final approval (step 615) as discussed above. However, if the payee does not sign the invoice, the payee is now able to make changes, additions, or deletions to the invoice (step 623). When the payee is finished making changes, the updated invoice is sent to the payor for review (steps 625 and 627). After reviewing the invoice (step 627), the payor decides whether to approve or reject the payee's updated invoice (step 629). If the payor approves the payee's changes, the invoice is ready to continue through the payment process (step 617). Otherwise, the payor makes additional changes to the invoice (step 605) and sends the invoice back to the payee (step 607).

As discussed above, the payor has the ability to unlock the invoice at any time (e.g., turn off specified billing) (step 631). If, for example, the payee has sent a message to the payor while reviewing the invoice (step 611) using the "chat" button 517 (FIG. 5), the payor may choose to remove the lock (step 631) and allow the payee to make changes directly to the invoice rather than the payor himself making the changes.

In some embodiments, an unlocked invoice can be edited by only the payee or by both the payee and the payor. In the case where both the payee and the payor have editing permission, the payor and the payee may collaboratively revise invoice details until the invoice is accepted and signed by the payee. As described above, the "chat" function can be used to facilitate such collaboration. The editing permissions associated with an unlocked invoice are selectable by the project manager (e.g., a payor or general contractor).

In some embodiments, the payor (e.g., a general contractor) retains the ability to enter invoice details until a specified invoice has been sent to the payee (e.g., a subcontractor). However, in some embodiments, after the payor has requested an invoice (e.g., step 601), either the payor or the payee can enter the details for the invoice. In the latter case, if a general contractor (as "payor") does not enter the details of an invoice for a subcontractor before the subcontractor (as "payee") enters the invoice details, the system may limit or prevent the general contractor from entering a specified invoice for the subcontractor.

Figure 7:
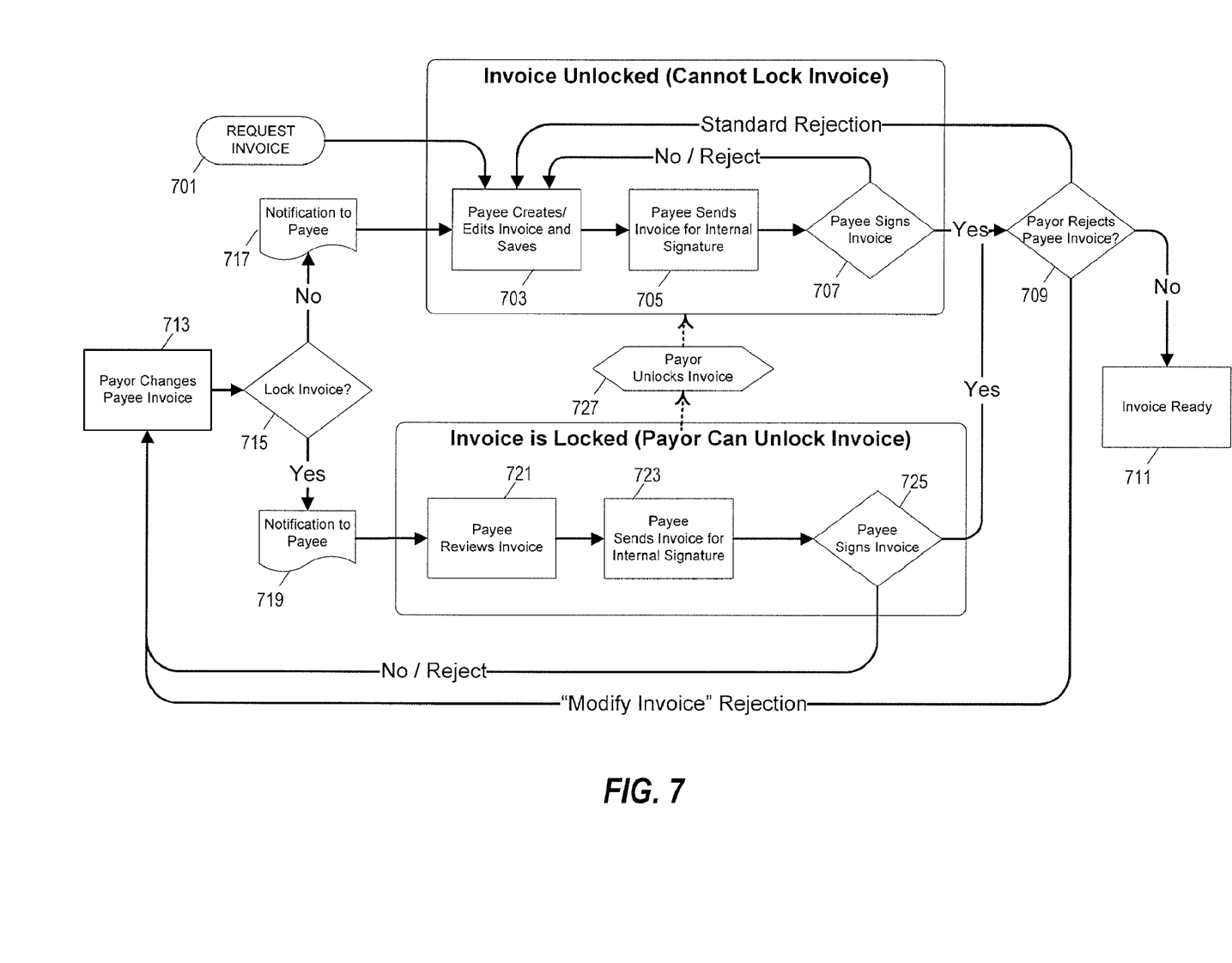
FIG. 7 is a flow chart showing the creation of an invoice initiated by the payee according to one embodiment of the invention where specified billing can selectively be turned on or off.

FIG. 7 illustrates a scenario where the invoice is initiated with specified billing turned off (i.e., the invoice lock removed). After the payor requests an invoice (step 701), the invoice is unlocked and the payee is able to enter and edit the details of the invoice (step 703). After the details have been entered, the invoice can be sent to a user associated with the payee that has approval and signing authority for an internal payee review (step 705). At this time, the payee can either sign the invoice (step 707) or make further additions, deletions, or changes (step 703). When the payee approves the invoice, an electronic signature is attached (step 707) and the invoice is sent to the payor for review.

If the payor approves the invoice (step 709), another electronic signature is attached (step 711) and the invoice is ready to be paid. However, if the payor does not approve, the payor can either return it to the payee for further edits (step 703) or can choose to make changes directly to the invoice (step 713). If the payor makes changes directly (step 713), the invoice will be returned to the payee with the lock either turned on or off (i.e., payor-specified billing or payee-specified billing) (step 715). If the invoice is returned with the lock off, a notification describing the status of the specified billing setting is sent to the payee (step 717) and the payee can make further changes to the invoice (step 703). The process continues as discussed above. Notifications (not shown) may also be used with the method of FIG. 6.

However, if the invoice is returned with the lock turned on, the payee no longer has the ability to make changes directly to the invoice. The system sends a notification to the payee informing the payee that the invoice lock has been turned on and specified billing is activated (step 719). The payee reviews the invoice (step 721) and sends it to the party with signing authority for a final internal payee review (step 723). If the payee approves of the updated invoice, an electronic signature is attached (step 725) and the invoice is returned to the payor for final approval (steps 709 and 711). If the payee does not approve, it is sent back to the payor for further edits (step 713). As discussed above in reference to FIG. 6, the payor has the ability to unlock the invoice at any time (step 727).

Figure 8:
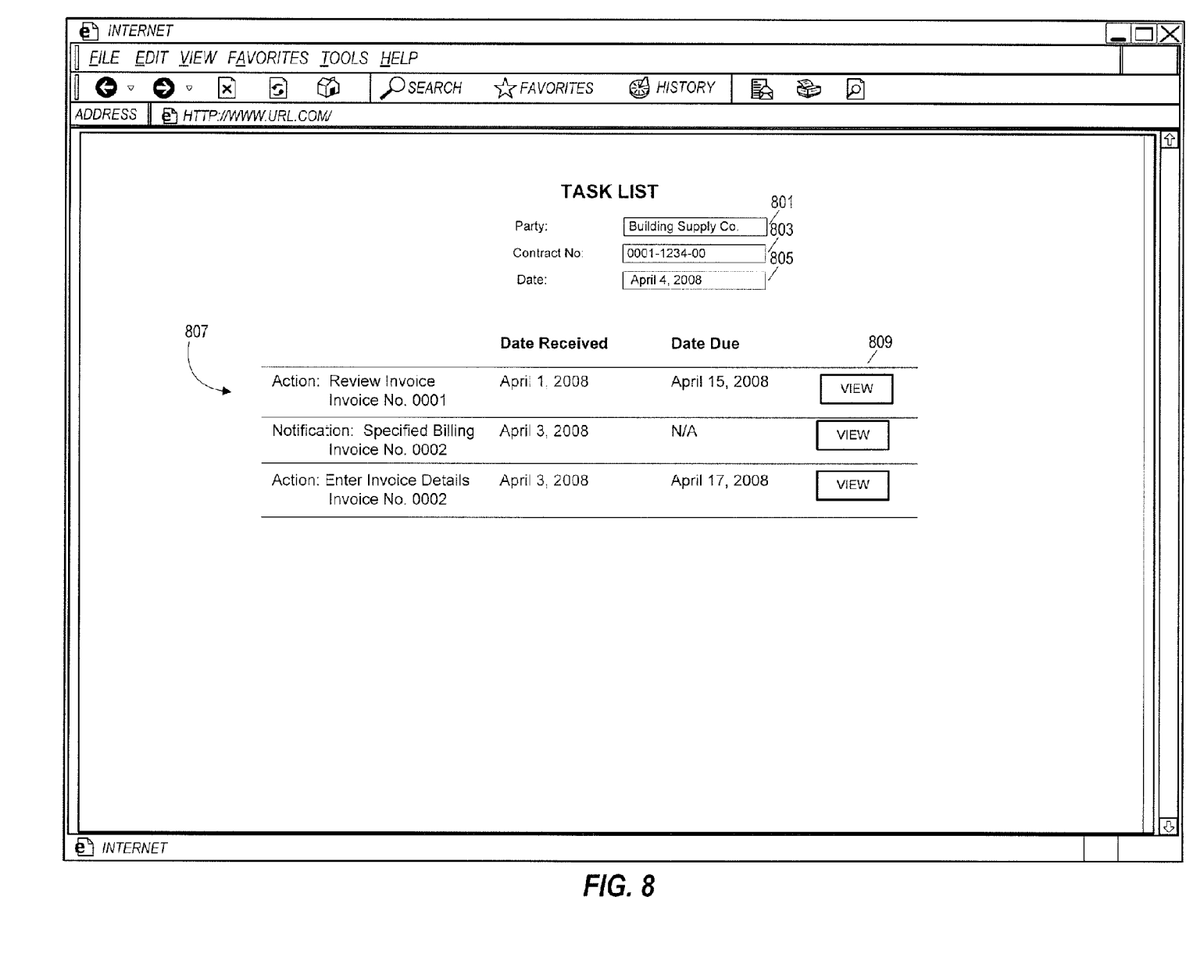
FIG. 8 is a graphical user interface showing outstanding tasks for a participant.

As discussed above, in some embodiments, notifications and action items are sent to a user when certain events occur. For example, as shown in FIG. 7, a notification is sent when a specified billing setting has been changed and when a created invoice is pending review. FIG. 8 shows a graphical user interface for presenting these notifications according to one embodiment. When a user (e.g., a payor, a payee, a general contractor, or a subcontractor) accesses the system 100, the task list page identifies the user (801), a contract number (803), and the current date (805). In some embodiments, the contract number field (803) is selectable so that the same user can view tasks for different contracts.

Table 807 shows the outstanding tasks/notifications for the party. For example, in FIG. 8, "Building Supply Co." needs to review invoice number 0001 and enter details for invoice number 0002. The task list also includes a notification informing Building Supply Co. that the specified billing status has been changed for invoice number 0002. Table 807 also includes a date received and a date due. The user accesses individual items from the list by selecting the "view" button 809 corresponding to the applicable item.

Figure 9:
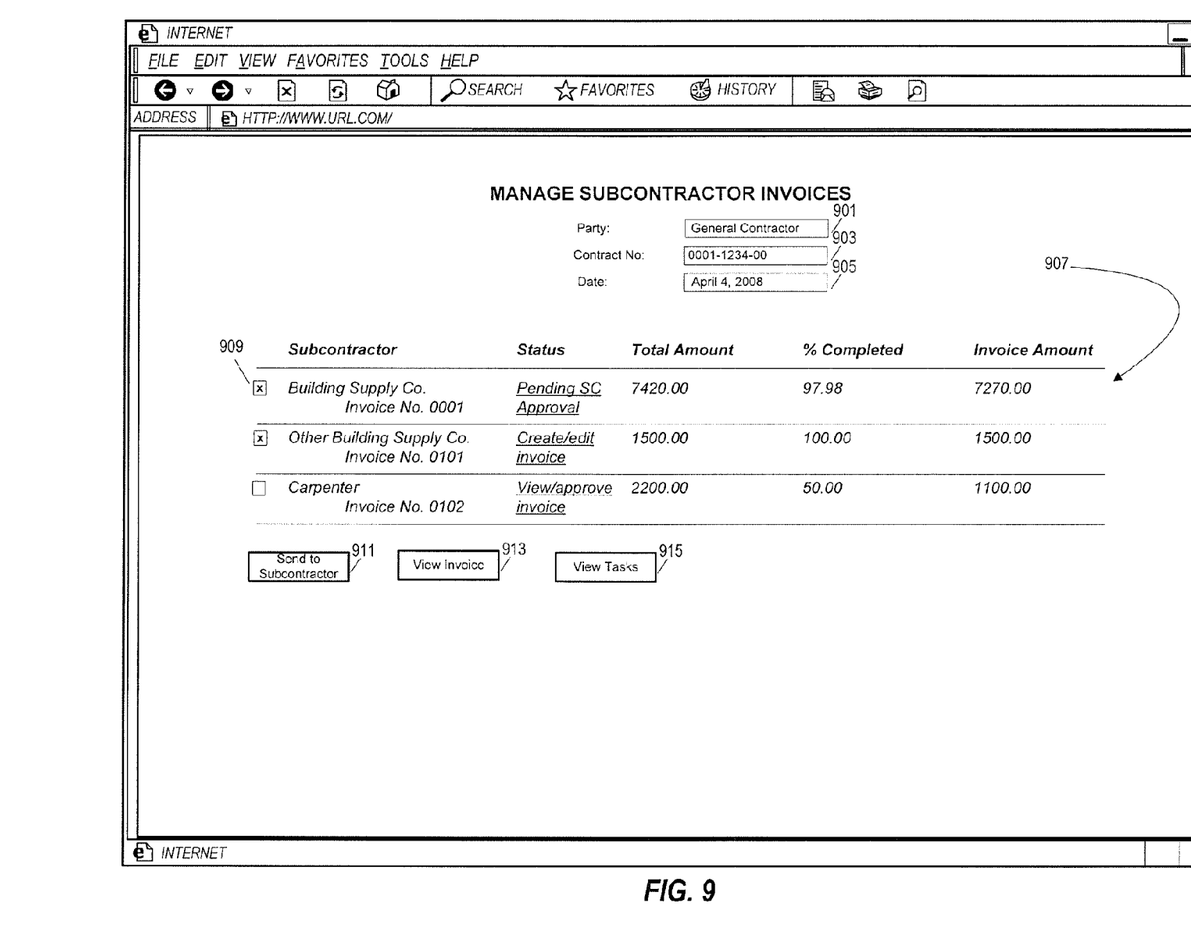
FIG. 9 is a graphical user interface for managing subcontractor invoices.

FIG. 9 illustrates a "staging page" from which a user (e.g., a general contractor) can manage several invoices. The staging page identifies the user (901), the contract number (903), and the current date (905). In some embodiments, the contract number field 903 is selectable so that the user can view invoices for different contracts. The table 907 provides information for each invoice such as the subcontractor name, the invoice number, the current status of the invoice, the total amount to be billed, the percent completed, and the actual amount being billed on the invoice. The user selects an invoice by marking the box 909 corresponding to the applicable invoice. After selecting one or more of the listed invoices, the user selects one of the buttons 911, 913, 915 to perform the associated operation. For example, the user can send the invoice to a subcontractor (button 911), view the current version of the invoice (button 913), or view tasks associated with an invoice (button 915). In some embodiments, the "status" field in table 907 includes a hypertext link to an interface for completing the outstanding task (e.g., the graphical user interface of FIG. 4a or FIG. 5).

In some embodiments, the payment management system 100 is used to manage hierarchical invoicing for situations involving more than one contractual level. For example, a property owner contracts with a general contractor to construct a building. The general contractor then hires one or more subcontractors to complete certain tasks (e.g., carpentry, plumbing, etc). In such situations, invoicing at one level can restrain or inform invoicing at another level.

In some embodiments, the payment management system 100 manages hierarchical invoicing depending upon the specified billing settings at different levels. For example, if standard invoicing (i.e., payee specified invoicing) is turned on at a project level, a subcontractor submits an invoice to the general contractor. If the general contractor approves the invoice, the payment management system 100 uses the details from the subcontractor invoice as default details when generating the invoice to be submitted by the general contractor to the property owner. Similarly, if specified billing is turned on at a project level, the invoice specified by the property owner provides invoice details for the subcontractor invoice.

The payment management system 100 can also implement different specified billing settings at different hierarchical levels. For example, the general contractor may create subcontractor invoices using only specified billing, while the invoices paid by the property owner to the general contractor are created using collaborative invoicing described in FIGS. 6 and 7. In some embodiments, the payment management system 100 then uses the details from the property owner invoice as default details for the subcontractor invoice. Similarly, the property owner may use only specified billing (either directly or through a third party such as a quantity surveyor) to prepare invoices for the general contractor, while the subcontractors submit invoices to the general contractor using standard invoicing. In such cases, the property owner's specified invoice includes the total amount to be paid to the general contractor regardless of the invoices submitted to the payee by contractual children at lower levels (e.g., subcontractors). Such subcontractor invoices do not change the totals on a payor-specified invoice.

Payments to contractual children and the management of such a contract/budget hierarchy are discussed in pending U.S. patent application Ser. No. 11/485,545 filed Jul. 12, 2006 and Ser. No. 11/485,610 filed Jul. 12, 2006, both of which are incorporated herein by reference.

The constructions and methods described above are illustrative. Other configurations, designs, and uses are possible. Embodiments of the invention can be applied to a variety of situations wherein one party is specifying the details of an invoice and another party is approving and signing the invoice. The scope of the invention, therefore, is not limited to transactions between a general contractor and a subcontractor, nor is it limited to situations involving a payor and a payee. For example, as discussed above, in certain embodiments a third party defines the details of the invoice and neither the payor nor the payee has any control over the process. The terms "payor" and "payee" are not limited to general contractors and subcontractors. For example, the payor may be a bank or property owner while the payee is the general contractor. In other examples, the payee may be a vendor, a material supplier, or a subcontractor.

Although the payment management system 100 is described above as a web-based application running on a server and accessed by personal computers through the Internet, other system architectures are possible. For example, in some embodiments, the entire software application runs on a single terminal. In others, the software application runs on two or more personal computers connected directly to each other without a central server. As such, the term "processor" is intended to include an individual CPU/microprocessor or multiple CPUs on several terminals connected to the payment management system 100. Various features and advantages of the invention are set forth in the following claims.

We claim:

1. A construction payment management system comprising:
   a software enabled user interface accessible by a first participant associated with a construction project and a payee associated with the construction project;
   a computer readable memory; and
   a processor configured to
      selectively operate in either a specified billing mode or a normal mode in response to an input received from the first participant,
      wherein operating in the specified billing mode includes
         receiving invoice details from the first party,
         generating an invoice based on the invoice details received from the first participant,
         displaying the invoice to the payee,
         requesting an approval or a rejection of the invoice from the payee, and initiating a payment to the payee after receiving the approval of the invoice from the payee, and wherein operating in the normal mode includes
receiving invoice details from the payee,
generating the invoice based on the invoice details received from the payee,
displaying the invoice to the first participant,
requesting an approval or a rejection of the invoice from the first participant, and
initiating a payment to the payee after receiving the approval of the invoice from the first participant.

2. The construction payment management system of claim 1, wherein the processor is further configured to notify the payee when the specified billing mode has been turned on or off.

3. The construction payment management system of claim 1, wherein the processor is further configured to initiate the payment to the payee after receiving the approval of the invoice from both the first participant and the payee.

4. The construction payment management system of claim 1, wherein the processor is further configured to prevent the payee from entering invoice details when operating in the specified billing mode.

5. The construction payment management system of claim 1, wherein the processor is further configured to prevent the first participant from entering invoice details when operating in the normal mode.

6. The construction payment management system of claim 1, wherein the processor is further configured to turn the specified billing mode on or off for a particular invoice in response to the input from the first participant.

7. The construction payment management system of claim 1, wherein the processor is further configured to turn the specified billing mode off after receiving the rejection of the invoice from the payee and the input from the first participant.

8. The construction payment management system of claim 1, wherein the processor is further configured to turn the specified billing mode on after receiving the rejection of the invoice from the first participant and the input from the first participant.

9. The construction payment management system of claim 1, wherein the processor is further configured to turn the specified billing mode on for new invoices by default.

10. The construction payment management system of claim 1, wherein the processor is further configured to turn off the specified billing mode at any time in response to the input from the first participant.

11. The construction payment management system of claim 1, wherein the processor is further configured to receive a comment from one of the first participant and the payee, and
display the comment to the other of the first participant and the payee.

12. The construction payment management system of claim 11, wherein the processor is further configured to display the comment and a plurality of other comments received from the first participant and the payee in a chronologically ordered list.

13. The construction payment management system of claim 11, wherein the processor is further configured to associate the comment with a change made to the invoice details.

14. The construction payment management system of claim 11, wherein the processor is further configured to associate the comment with an approval or a rejection of the invoice.

15. The construction payment management system of claim 11, wherein the processor is further configured to store the comment to the computer readable memory.

16. The construction payment management system of claim 15, wherein the processor is further configured to store the comment and a plurality of other comments received from the first participant and the payee to the computer readable memory in a chronologically ordered list.

17. The construction payment management system of claim 11, wherein the comment includes a textual comment.

18. The construction payment management system of claim 17, wherein the textual comment includes a link to a photograph.

19. The construction payment management system of claim 11, wherein the comment includes a photograph.

20. The construction payment management system of claim 11, wherein the comment includes at least one of a video recording and an audio recording.

21. The construction payment management system of claim 1, wherein the first participant is a quantity surveyor.

22. The construction payment management system of claim 1, wherein the first participant is a general contractor and the payee is a subcontractor.

23. The construction payment management system of claim 1, wherein the invoice details include
a total value for materials and services that a contractor is obligated to provide for the construction project, and
a percentage of completion associated with the materials and services.

24. The construction payment management system of claim 1, wherein the processor is further configured to receive an electronic signature verifying the approval of the invoice from the first participant or the payee.

* * * * *